US007359026B2

(12) United States Patent
Bullwinkel et al.

(10) Patent No.: US 7,359,026 B2
(45) Date of Patent: Apr. 15, 2008

(54) LIQUID CRYSTAL DISPLAY PROJECTOR

(76) Inventors: Paul Bullwinkel, 1600 NW. Fork Rd., Stuart, FL (US) 34994; Jim Seal, 18333 102 Way South, Boca Raton, FL (US) 33498; Keith A. Kopp, 2039 NE. Ginger Ter., Jensen Beach, FL (US) 34957

( * ) Notice: Subject to any disclaimer, the term of this patent is extended or adjusted under 35 U.S.C. 154(b) by 20 days.

(21) Appl. No.: 10/364,917

(22) Filed: Feb. 11, 2003
(Under 37 CFR 1.47)

(65) Prior Publication Data

US 2005/0012737 A1 Jan. 20, 2005

Related U.S. Application Data

(60) Provisional application No. 60/380,313, filed on May 13, 2002.

(51) Int. Cl.
*G02F 1/1346* (2006.01)

(52) U.S. Cl. .......................... 349/150; 353/37; 353/64; 353/89

(58) Field of Classification Search ................ 349/150, 349/5-10, 510; 353/64, 37, 89
See application file for complete search history.

(56) References Cited

U.S. PATENT DOCUMENTS 5,815,018 A * 9/1998 Soborski ..................... 327/172
5,920,361 A * 7/1999 Gibeau et al. .............. 348/750
6,016,038 A * 1/2000 Mueller et al. ............. 315/291
6,212,213 B1 * 4/2001 Weber et al. ................. 372/50
6,280,034 B1 * 8/2001 Brennesholtz ............... 353/20
6,285,491 B1 * 9/2001 Marshall et al. ............ 359/292
6,365,526 B1 * 4/2002 Kanamori et al. .......... 438/748
6,561,653 B2 * 5/2003 Belliveau ..................... 353/31
2001/0048560 A1 * 12/2001 Sugano ....................... 359/618
2003/0133080 A1 * 7/2003 Ogawa et al. ................ 353/31
2004/0246217 A1 * 12/2004 Hirakawa et al. ............. 345/88

* cited by examiner

*Primary Examiner*—David Nelms
*Assistant Examiner*—Phu Vu
(74) *Attorney, Agent, or Firm*—McHale & Slavin, P.A.

(57) ABSTRACT

A liquid crystal projector comprises first, second and third liquid crystal panels having corresponding light sources, namely a red light source, a green light source, and a blue light source, wherein the red light source. The light sources are preferably Semi-conductor generated light arrays. The projector further includes a dichroic prism for superimposing the red, green and blue image displays, and a projection lens for projecting a full-color image beam formed by the dichroic prism. In order to control the intensity of the light sources, a pulse modulating means is coupled to each of the Semi-conductor generated light arrays, the pulse modulating means being operable to independently switch each of the light sources between an on state and an off state at a selectable repetition rate. An embedded processor is coupled to the pulse modulating means, wherein the processor is operable to control the selectable repetition rates hereby the relative brightness of each of the red, green and blue light sources can be independently and selectively varied. The invention also discloses a method for providing a precise visual stimulus for any environment.

13 Claims, 1 Drawing Sheet

LIQUID CRYSTAL DISPLAY PROJECTOR

CROSS REFERENCE TO RELATED APPLICATIONS

This application claims the benefit of the filing date of U.S. application No. 60/380,313 filed May 13, 2002, the contents of which are incorporated herein by reference.

FIELD OF THE INVENTION

This invention relates generally to the field of projection display devices, and more particularly to projection displays utilizing liquid crystal display (LCD) image generation devices to provide a precise visual stimulus as is required in the magnetic resonance imaging.

BACKGROUND OF THE INVENTION

It is important in the practice of functional magnetic resonance imaging (fMRI), as well as many other visual experiments, to provide visual stimulus having precisely controlled and well defined start times and presentation durations. In some instances, the diagnostic procedure performed with the MRI is used to evaluate a patient's response to specific visual stimuli. The operator sends a series of images to a screen which is seen by the patient during the MRI procedure and the patient's responses are included in the MRI report.

Three important parameters must be controlled for predictable visual stimulus: color balance, brightness, and stimulus duration. Both the cathode ray tube (CRT) and the liquid crystal display (LCD) in conjunction with a projection lamp are used as image generation projectors.

The timing of a CRT is synchronized by the frame rate (also called the vertical deflection frequency). The frame rate is the time required for the raster to completely scan the screen. Typical frame rates are in the 60-150 Hz range. To write a complete frame, only discrete multiples of the time required for the raster to complete a frame are acceptable. Further, a new image can only begin at the beginning of a new frame. Even when these restrictions are observed and carefully controlled, additional time errors will be present. Generally, the raster is written from the top of the screen to the bottom. Therefore a small image object near the top of the screen will be seen sooner than an image at the bottom of the screen.

For the conventional LCD-lamp projector the limitations imposed by the frame rate described for the CRT are still present. Durations which are multiples of the frame rate are achievable. But the LCD-lamp projector has additional limitations. Because the conventional LCD has a relatively slow response time, frame rates are usually limited to 60 Hz. It may take several frames for an image to fully appear.

The LCD lamp projector also can have other time errors. The VGA signal supplied by a computer is usually an analog signal. But the LCD is driven with digital electronics. As a result, the signal undergoes an analog to digital conversion process inside the projector. This conversion process decouples the timing synchronization pulses inside the incoming VGA signal from the timing of when an image is displayed. An incoming signal could just miss being sampled by the analog to digital converter and have to wait until the next frame before being displayed. Terminating the display of an image contains the same indeterminacy. Delays from 7-40 ms have been measured for both turn on and turn off of an image.

Color balance can be achieved to some extent with the CRT. Many devices allow adjustment of the maximum intensity of the electron beams directed at the red, green and blue phosphor dots. The relative intensity of these dots (called sub-pixels) affects the perceived pixel color. Each pixel (usually a group of one each of a red, green, and blue sub-pixel) is simultaneously stimulated sequentially in the moving dot raster process.

The difficulty with color control in a CRT is two-fold: 1) the relationship of color intensity to electron beam intensity changes as the phosphors age; and 2) the electron beam intensity to brightness transfer function is non-linear. Color calibration with a CRT usually consists of applying a video signal set to supply a maximum emission of the red, green and blue electron beams. The color perceived when these maximum conditions are present is called the "white point." This ratio of red, green and blue brightness is only valid at the test electron emission intensities. As stated above, each phosphor has a unique non-linear electron beam intensity to brightness transfer function. In an attempt to correct for this non-linearity, a number of intensity points are measured for each color and a set of $\gamma$-correction curves are generated. The $\gamma$-correction curves produce an approximate correction factor for each color. The process of white point and $\gamma$-correction adjustment must be repeated regularly, not only because of phosphor aging, but also because of environmental factors such as ambient lighting conditions and stray magnetic and electromagnetic fields.

The LCD lamp projector has a more limited ability to control color balance than even the CRT. Illumination is usually provided by an incandescent light source with a color temperature in the range of 3000-3800 K. This color temperature changes with supply voltage and lamp aging. An LCD lamp projector in its generic form consists of an array of red, green and blue filters positioned over liquid crystal variable shutter sub-pixels. The white point is determined by the lamp color temperature, the red, green, and blue filter characteristics, the LCD transmission characteristics, as well as other optical factors. None of these factors can be adjusted during use to produce a different white point.

A pseudo change in white point can be accomplished by decreasing the maximum allowable transmission (minimum transparency) for one or more of the sub-pixel color arrays. But by decreasing the maximum allowable transmission for a color, the contrast ratio range for the adjusted sub-pixel array is also reduced. Color calibration must also be performed after the lamp is "broken in" and after the map has warmed up to stabilize.

Brightness can be varied in a CRT but not in a linearly predictable fashion. As such, changes in brightness require calibration. Brightness adjustment in a LCD projector is limited if it exists at all. Lamp power dissipation can sometimes be varied a small amount. Lamp power changes will alter the color temperature as well as affect the lamp life.

A problem with introducing conventional audio or video signals into an MRI apparatus is that the device is based upon the use of radio frequency which will disrupt signal modulation. Further, the inner area of the bore produces a magnetic field which will draw metal items when magnetized. For this reason, the audio or video signal must be in a form that is not affected by the radio frequency and transmission by a mechanism that is not easily magnetized. This problem has been eliminated in the prior art by providing a fiber optic connection between the shielded MRI room and a remote location housing the elements of the system. An example of such a device is seen in U.S. Pat. No. 5,414,459, the disclosure of which is herein incorporated by reference.

Thus, what is lacking in the art is an LCD projection system adapted for use in an MRI environment which allows for precise control of the display parameters in order to provide a precise visual stimulus via a fiber optic connection.

SUMMARY OF THE INVENTION

It is an objective of the invention to provide an LCD projector which includes Semi-conductor generated light arrays operated by control electronics to provide precise and stable control of the projection system color temperature.

It is another objective to provide a LCD projector which includes Semi-conductor generated light arrays operated by control electronics to adjust the color control over a wide range.

It is still another objective to provide a LCD projector which includes Semi-conductor generated light arrays operated by control electronics to maintain constant calibrated color temperature over an extended period of time.

It is a further objective of the invention to provide a LCD projector which includes Semi-conductor generated light arrays operated by control electronics to vary the brightness over a large range.

It is yet a further objective of the invention to provide LCD projector which includes Semi-conductor generated light arrays operated by control electronics which maintains constant calibrated brightness over an extended period of time.

It is still a further objective of the invention to provide a LCD projector which includes Semi-conductor generated light arrays operated by control electronics which maintains color temperature when the image brightness is varied.

It is still another objective of the invention to provide a LCD projector which includes Semi-conductor generated light arrays operated by control electronics to precisely control the start time as well as the duration of visual stimulus presentation.

It is yet another objective of the invention to provide a LCD projector which provides an complete, fully developed stimulus immediately upon request.

In accordance with the above objectives, a liquid crystal projector comprises first, second and third liquid crystal panels having corresponding light sources, namely a red light source, a green light source, and a blue light source, wherein the red light source causes a red beam to be directed to the first liquid crystal panel to display a red image display, the green light source causes a green beam to be directed at the second liquid crystal panel to produce a green image display, and the blue light source causes a blue beam to be directed to the third liquid crystal panel to produce a blue image display. The light sources are Semi-conductor generated light arrays. The projector can also include mirrors for directing the red, green and blue beams to the respective liquid crystal panels. The projector further includes a dichroic prism for superimposing the red, green and blue image displays, and a projection lens for projecting a full-color image beam formed by the dichroic prism. In order to control the intensity of the light sources, aa pulse modulating means is coupled to each of the Semi-conductor generated light arrays, the pulse modulating means being operable to independently switch each of the light sources between an on state and an off state at a selectable repetition rate. An embedded processor is coupled to the pulse modulating means, wherein the processor is operable to control the selectable repetition rates hereby the relative brightness of each of the red, green and blue light sources can be independently and selectively varied. In the preferred embodiment, the repetition rate can be varied between 20 kHz and 100 kHz, but can be performed at any frequency. An external trigger can be coupled to the processor, wherein the external trigger is operable to independently control the repetition rates of the pulse width modulators, also enable and disable the pulse width modulators.

The invention also discloses a method for providing a precise visual stimulus in liquid crystal projector of the invention which comprises the steps of: switching the red, green and blue Semi-conductor generated light arrays off; transmitting an image to the liquid crystal display panels and allowing the image to stabilize; and illuminating the red, green and blue light sources, wherein the output of each of the red, green and blue light sources is pulsed by pulse modulating means at a pre-selected repetition rate.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
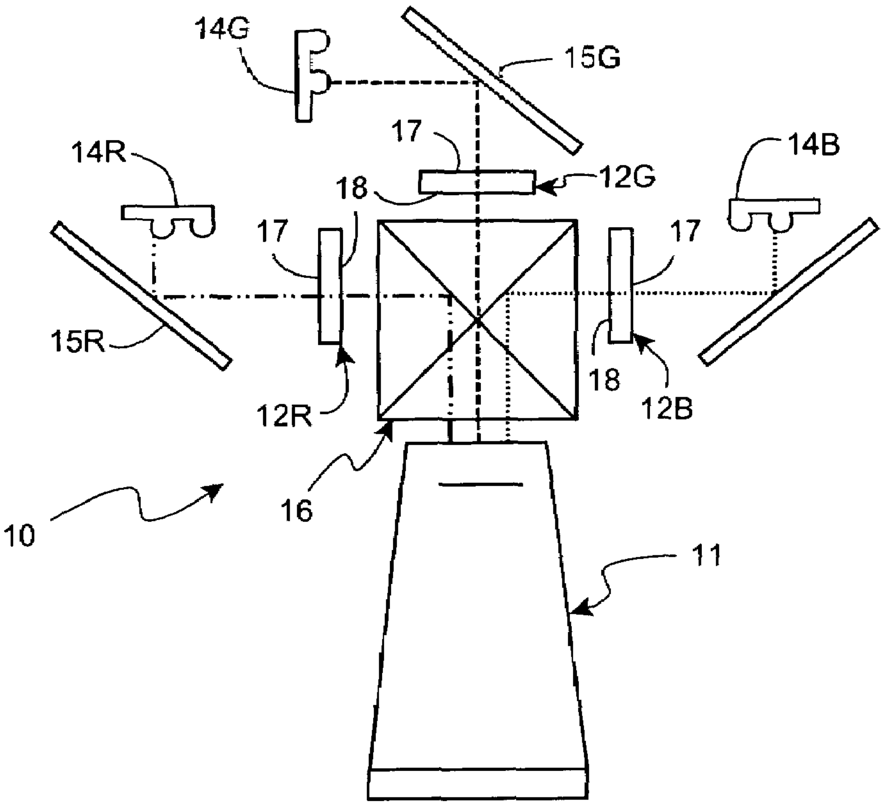
FIG. 1 is a schematic illustration of a liquid crystal display projector according to a preferred embodiment of the invention.

FIG. 1 illustrates the arrangement of elements of the projection system 10 of a liquid crystal projector unit. A projection lens assembly 11 is arranged at the front surface of the unit. The projection system 10 includes three liquid crystal display (LCD) panels denoted as 12R, 12G, and 12R which each include an incident light polarizing plate 17 on its incident surface and an image forming polarizing plate 18 on its output surface. The LCD panels 12R, 12G, and 12B respectively functions as a red image display for displaying a red image, a green image display for displaying a green image, and a blue image display panel for displaying a blue image. The LCD panels 12R,12G and 12B respectively display images of red, green and blue components constituting a single full color image. One of the LCD panels, e.g. green image display panel 12B, is arranged such that its output surface opposes projection lens 11. The other two LCD panels, i.e. red and blue display panels 12R and 12B, are arranged at both side surfaces of a dichroic prism 16, which is arranged between liquid crystal panel 12G and projection lens 11, such that the output surfaces of LCD panel 12R and 12B oppose each other. In addition, LCS panels 12R, 12G and 12B are located at the same distance from the center of dichroic prism 16.

The projection system 10 of the preferred embodiment includes three separate light sources for radiating beams onto LCD panels 12R, 12G, and 12B respectively. The light sources are preferably Semi-conductor generated light arrays 14R, 14G and 14B, which output red, green and blue light respectively. The Semi-conductor generated light arrays 14R, 14G and 14B include a plurality of high output Semi-conductor generated lights installed in a frame. The light emitted by the red Semi-conductor generated light array 14R is directed to mirror 15R which redirects a red beam R light through LCD 12R to a project an image onto a surface within dichroic prism 16 which only reflects the light in the red visible spectrum. Similarly, the light emitted by the blue Semi-conductor generated light array 14B is directed to mirror, 15B which redirects the blue beam B through LCD 12B to project an image onto a surface within dichroic prism 16 which only reflects the light in the blue visible spectrum. Finally, the light emitted by the green Semi-conductor generated light array 14G is directed at mirror 15G, which redirects the green light through LCD 12G. The image produced by LCD 14G passes undisturbed through the combining dichroic prism to the projector lens assembly 11. The dichroic prism 16 superimposes the red, green and blue images and the full color image beam thus formed is projected through the projector lens assembly 11.

In addition, in this embodiment, reflection enhancing mirrors each having a reflecting surface within a reflection coating or dichroic mirrors are used as mirrors 15R, 15G, and 15B. If reflection enhancing mirrors are used, their reflectivities can be increased.

If the dichroic mirrors are used as mirrors 15R, 15G and 15B, each mirror can be designed to reflect a color beam with a slightly narrowed wavelength band and transmit beams having the other wavelength range. If the dichroic mirrors are used as the respective mirrors in this manner, red, green, and blue beams incident on the LCD panels 12R, 12G and 12B can be made closer to the primary colors, respectively.

Figure 2:
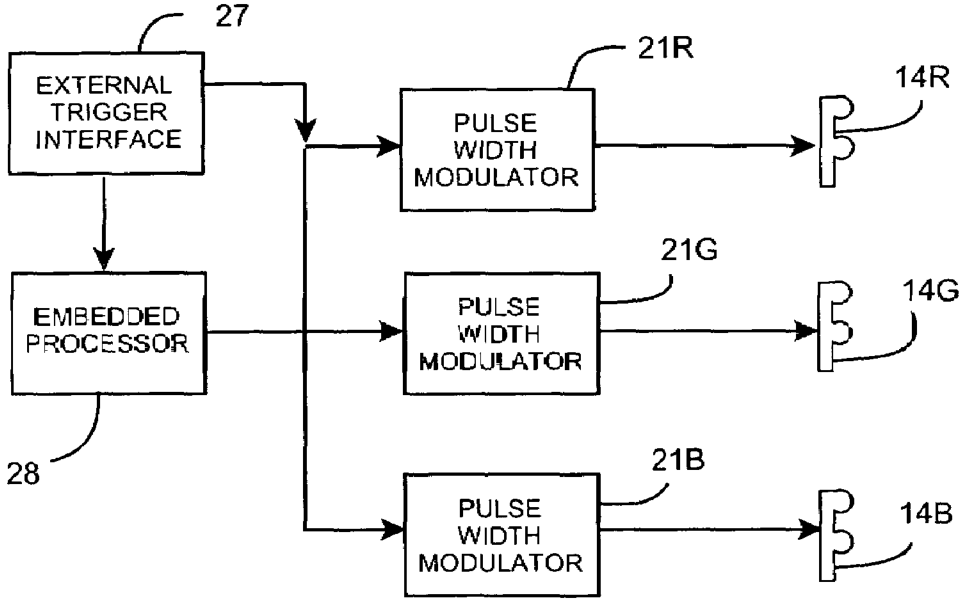
FIG. 2 illustrates the control electronics for controlling the relative brightness of the individual Semi-conductor generated lights shown in FIG. 1.

As shown in FIG. 2, the Semi-conductor generated light arrays 14R, 14G, and 14B are respectively driven by pulse width modulators 21R, 21G and 21B which are coupled to a processor 28 and external trigger 27. The function of the pulse width modulators 21R, 21G and 21B is to turn the Semi-conductor generated light arrays 14R, 14G and 14B on and off at a high repetition rate, preferably 20 kHz to 100 kHz. The ratio of Semi-conductor generated light on-time to off-time (duty cycle) is controlled by the processor 28 the external trigger interface 27.

The processor 28 or the external trigger interface 27 can independently control all three Semi-conductor generated light arrays 14R, 14G and 14B. This independent control includes change in average brightness and turning the array on and off for an extended period of time. The optics and the electronics are so configured such that the red color sub-pixel produce by LCD 12R is combined with the blue sub-pixel from LCD 12B and the green sub-pixel from LCD 12G to produce a single dot whose color is the function of the relative intensity of the relatively brightness of the red, green and blue sub-pixel.

Since the white point of a pixel array is represented by the ratio of the relative brightness of each of the primary color sub-pixel components, a desired white point may be achieved by adjusting the relative Semi-conductor generated light array brightness. This is accomplished by varying the repetition rates of pulse width modulators 21R, 21G and 21B. No loss in contrast ratio occurs. Since the brightness and spectral distribution of the Semi-conductor generated light arrays 14R, 14G and 14B are extremely stable, recalibration is required infrequently.

Further, since the brightness of an Semi-conductor generated light array is a linear function of the duty cycle of the pulse width modulator, color temperature may be accurately maintained even after varying overall image brightness. Changing the overall image brightness involves proportionally changing the duty cycle of each Semi-conductor generated light array pulse width modulators 21R, 21G and 21B. Changing brightness does no produce significant changes in color temperature or illumination source life.

Use of the pulse width modulators 21R, 21G and 21B makes it possible to turn the Semi-conductor generated light arrays 14R, 14G and 14B off and on very rapidly. Switching ties in the microseconds are achieved with the high output Semi-conductor generated lights used in the arrays. This switching time is considerably faster than the fastest physiological response requirements. The embedded processor 28 can be programmed to commence a series of visual events activated by the external trigger interface 27.

In practice, stimulus generation is accomplished by shutting down all the Semi-conductor generated light arrays. The desired image is then sent to the three LCDs 12R, 12G and 12B. The desired image is then sent to the LCDs 12R, 12G and 12B sufficiently in advance to allow the LCDs to stabilize before the stimulus is to appear. Using the external trigger interface 31 and/or the embedded processor 28, the Semi-conductor generated light arrays will be activated and the image viewed precisely when desired. The combined response time of the Semi-conductor generated light control electronics and the Semi-conductor generated light arrays is considerably faster than any physiological requirements. When the image appears, the selected color temperature and brightness will be present. A similar process is used to continue the stimulus paradigm and finally terminate it. The stimulus paradigm is maintained under precise color temperature, brightness and timing control. When a visual stimulus appears, it appears all at one with full-programmed brightness. This differs from the CRT projectors in the prior art in which the image is "painted" with the moving spot of a raster scan or from the conventional prior art LCD-lamp projector where the image slowly increases in contrast as the LCDs stabilize.

The liquid crystal display projector and stimulus generation system of the invention can be used to provide images to a patient undergoing an MRI or fMRI. In practice, a telephoto lens can be coupled to the projection engine incorporating the Semi-conductor generated light arrays and the control electronics. The image is then reproduced on a rear projection screen inside the MRI bore. Alternatively, a pair of optical engines each having the Semi-conductor generated light arrays and control electronics of the invention are coupled to a pair of optical assemblies, which are in turn coupled to a pair of image guides. The outputs of the image guides are coupled to each eye of the patient. These systems are described in U.S. Pat. Nos. 5,892,566; 6,079,829 and co-pending application Ser. No. 09/706,523, filed Nov. 3, 2000, the disclosures of which is herein incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A liquid crystal projector having controllable brightness adapted for use in an MRI environment, comprising:

first, second and third liquid crystal panels having a stabilized image thereon wherein an image is completely written to each said panel;

an individual generated red light source emitting at a stable color temperature, an individual generated green light source emitting at a stable color temperature, and an individual generated blue light source emitting at a stable color temperature, wherein said red light source causes a red beam to be directed to said first liquid crystal panel to produce a red image display, said green light source causes a green beam to be directed to said second liquid crystal panel to produce a green image display, and said blue light source causes a blue beam to be directed to said third liquid crystal panel to produce a blue image display;

a dichroic prism for superimposing said red, green and blue image displays;

a projection lens for projecting a full-color image beam formed by said dichroic prism;

a pulse modulating means coupled to each of said individual generated red light source, green light source, and blue light source, said pulse modulating means operable to independently switch each of said light sources between an on state and an off state at a selectable repetition rate, said stabilized image being a visible image in said on state; and processor means coupled to said pulse modulating means, wherein said processor means is operable to control said selectable repetition rates whereby the relative brightness of each of said red, green and blue light sources can be independently and selectively varied while maintaining said stable color temperature, as well as enable and disable the pulse width modulators;

whereby said projection lens transmits said stabilized image visually as said full color image precisely and immediately at said selectable repetition rate of said on state.

2. The liquid crystal projector of claim 1, wherein said individual red, green and blue light sources are Semi-conductor generated light arrays.

3. The liquid crystal projector of claim 1, further comprising:

a first mirror for reflecting said red beam from said red light source to said first liquid crystal panel; a second mirror for reflecting said green beam from said green light source to said second liquid crystal panel; and a third mirror for reflecting said blue beam from said blue light source to said third liquid crystal panel.

4. The liquid crystal projector of claim 1, wherein said repetition rate can be varied in a range of frequencies.

5. The liquid crystal projector of claim 1, further comprising an external trigger coupled to said processor, wherein said external trigger is operable to independently control the repetition rates of said pulse width modulators, as well as enable and disable the pulse width modulators.

6. A method for providing a precise visual stimulus in a liquid crystal projector having controllable brightness adapted for use in an MRI environment, comprising the steps of: providing first, second and third liquid crystal panels;

providing an individual generated red light source emitting at a stable color temperature, an individual generated green light source emitting at a stable color temperature, and an individual generated blue light source emitting at a stable color temperature, wherein the red light source causes a red beam to be directed to the first liquid crystal panel to display a red image display, the green light source causes a green beam to be directed to the second liquid crystal panel to produce a green image display, and the blue light source causes a blue beam to be directed to the third liquid crystal panel to produce a blue image display;

providing a dichroic prism for superimposing the red, green and blue image displays;

providing a projection lens for projecting a full-color image beam formed by the dichroic prism;

providing a pulse modulating means coupled to each of the red light source, green light source, and blue light source, the pulse modulating means operable to independently switch or synchronize each of the light sources between an on state and an off state at a selected repetition rate;

providing a processor means which is coupled to the pulse modulating means, wherein the processing means is operable to control said repetition rates whereby the relative brightness of each of the red, green and blue light sources can be independently and selectively varied while maintaining said stable color temperature switching the red, green and blue light sources off;

transmitting an image to the liquid crystal display panels and allowing the image to stabilize wherein the image is completely written to each said panel; and illuminating the red, green and blue light sources in said on state, wherein the output of each of the red, green and blue light sources is pulsed by pulse modulating means at said selected repetition rate; and projecting a visible full color image coincident with said on state.

7. The method of claim 6, wherein the individual red, green and blue light sources are Semi-conductor generated light arrays.

8. The method of claim 6, further comprising the step of providing a first mirror for reflecting the red beam from the red light source to said first liquid crystal panel; a second mirror for reflecting the green beam from the green light source to said second liquid crystal panel; and a third mirror for reflecting the blue beam from the blue light source to said third liquid crystal panel.

9. The method of claim 6, wherein the repetition rate of the pulse modulation means can be varied in a range of frequencies.

10. The method of claim 6, further comprising the step of providing an external trigger coupled to the processor, wherein the external trigger is operable to independently control the repetition rates of the pulse modulating means.

11. The liquid crystal projector of claim 3, further comprising said mirrors being dichroic mirrors whereby the wavelength band of each light source may be adjusted.

12. A liquid crystal display projector for presenting a fully developed visual stimulus with a precise start time and duration and having controllable brightness adapted for use in an MRI environment, comprising a means for transmitting a stabilized image to an LCD screen, wherein the image is completely written to said LCD screen, individually generated primary color Semi-conductor light source means emitting at a stable color temperature, for intermittently illuminating said LCD screen producing a visible image of said stabilized image at a selected frequency between 20kHZ and 100kHZ, a processor means operatively connected to each of said individually generated light source means for controlling said selected frequency and a lens operatively connected to said LCD screen for projecting said visible image whereby a fully developed visual stimulus immediately appears and disappears upon repetition of illumination of said LCD screen at said selected frequency controlled by said processor means;

a pulse modulating means operatively connected to said processor means and said light source for switching said light source between an on state producing said visual stimulus and an off state at a repetition rate and duration controlled by said processor means, said visual stimulus having a variable brightness, said brightness of said visual stimulus determined by said repetition rate whereby said stable color temperature is maintained.

13. A liquid crystal display projector for presenting a fully developed visual stimulus with a precise start time and duration of claim 12, further comprising said light source having an individually generated red Semi-conductor light array emitting at a stable color temperature, an individually generated green Semi-conductor light array emitting at a stable color temperature and an individually generated blue Semi-conductor light array emitting at a stable color temperature, and a prism between said LCD screen and said lens for superimposing the red visible image, the green visible image and the blue visible image producing a full color visual stimulus.

* * * * *